L. S. CHICHESTER.
Cotton Gin.
No. 11,355. Patented July 25, 1854.
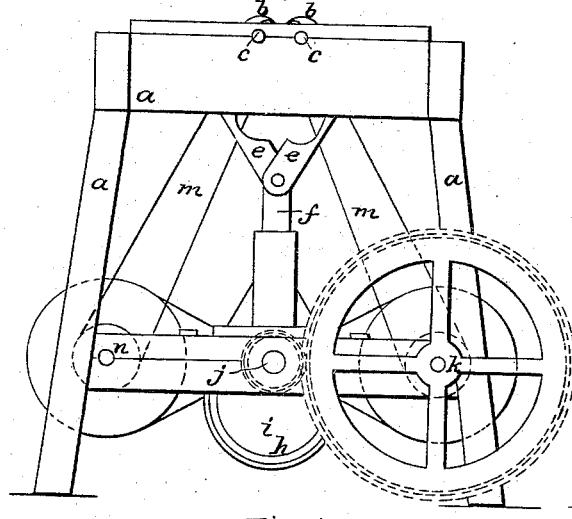
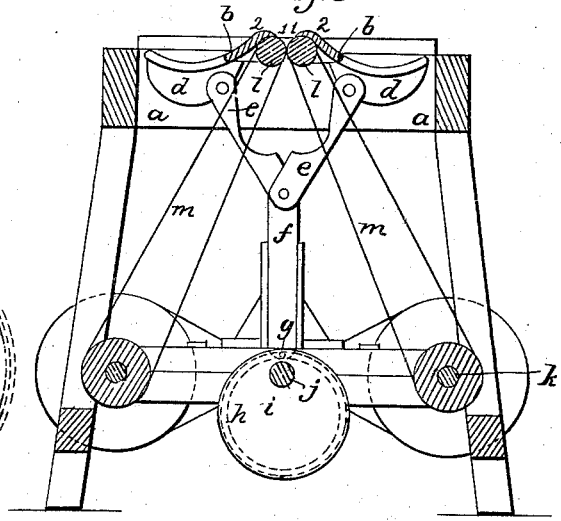
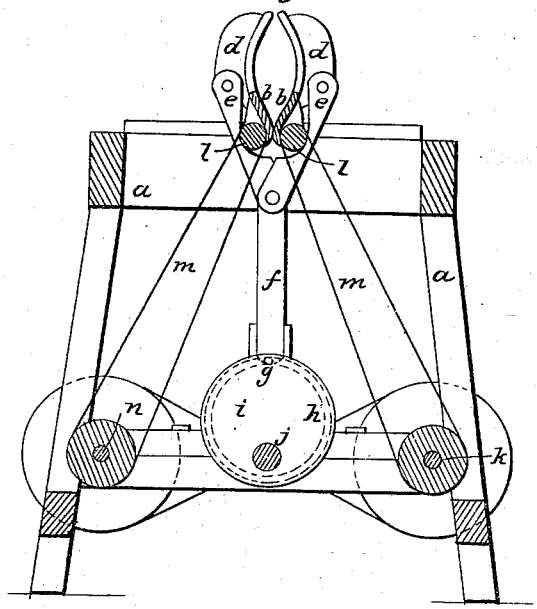
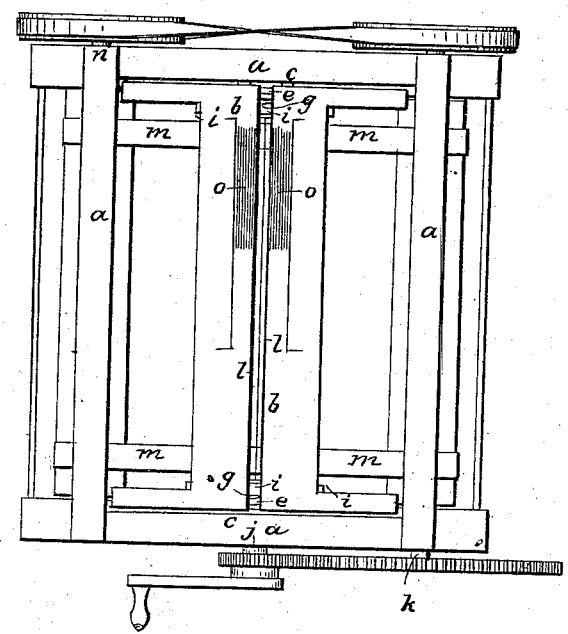

UNITED STATES PATENT OFFICE.

LEWIS S. CHICHESTER, OF BROOKLYN, NEW YORK.

IMPROVEMENT IN COTTON-GINS.

Specification forming part of Letters Patent No. 11,355, dated July 25, 1854.

*To all whom it may concern:*

Be it known that I, LEWIS S. CHICHESTER, of Brooklyn, New York, have invented certain new and useful Improvements in Cotton-Gins for Separating Cotton from the Seeds, of which the following is a full, clear, and exact description, reference being had to the accompanying drawings, making part of this specification, in which—

Figure 1 is a plan; Fig. 2, a side elevation; Figs. 3 and 4, vertical sections representing the parts in two different positions.

The same letters indicate like parts in all the figures.

My invention is mainly intended for ginning Sea Island and other long-staple cotton, but is equally applicable to other cotton.

Sea Island cotton is generally separated from the seeds by means of two rollers, which catch the fibers and pull them from the seeds, which are too large to pass between the rollers. The size of the rollers is necessarily limited in diameter and length—in diameter for the reason that the size of the pods of cotton and of the seeds will not permit the fibers to reach the bite of the rollers if they (the rollers) are more than one inch in diameter, this distance necessarily increasing with the increased size of the rollers, and in length because the diameter being limited, if made too long, they will bend and fail to catch the fibers at or near the middle of their length. For these reasons the roller-gin is not only limited in capacity, but by reason of the pulling-action of the rollers to strip the fibers from the seeds the staple is seriously injured. My invention avoids these defects entirely, and operates on an entirely different principle. If a pod of Sea Island cotton be grasped between the curved surface of the forefinger and thumb, with the part enveloping the seed in the open space, and the curved surface of the finger and thumb be rolled on each other from the hand toward the nails, carefully gripping the pod, the seed will be forced out, leaving the pod in the same condition as when the seed was in, and only flattened. The fibers are not pulled apart or separated, the seed, with its smooth surface, having worked its way through the fibers constituting the pod without injuring them.

My invention is organized for the purpose of and does perform the same operation as the finger and thumb, above described; and my said invention consists in the employment of two vibrating curved surfaces acting jointly, so that in their vibration in one direction they separate to permit the pods of cotton to descend between them, and in their return motion gradually approach to grip the pods below the seeds, and having so gripped them these surfaces continue to roll, gradually forcing the seeds out of their pods without drawing or pulling the fibers, but by simply rolling on them; and as these vibrating surfaces turn or roll back, two rollers below them are gradually brought together and take the pods discharged of their seeds, or so much of them as may have been cleared of the seeds, and as the vibrating surfaces liberate take them and draw them down and discharge them into any suitable receptacle, the said rollers again separating as the vibrating curved surfaces again repeat their action; and my said invention also consists in so forming the vibrating curved surfaces that their gripping curved surfaces shall only extend so far that their upper edges will come as near together, or nearly so, as the other portions of their gripping-surfaces, and permit the seeds to rest on their edges, and thereby act as the finger and thumb-nail in clearing the seed from the pods, which could not be done if the curved surfaces extended beyond these edges.

In the accompanying drawings, *a* represents a frame, which may be varied at pleasure, and *b b* two vibrating plates, whose journals *c c* are fitted to suitable boxes in the upper part of the frame, so that their surfaces shall be parallel in a longitudinal direction. These plates have arms *d d d d* at each end, the arms of the two at each end being connected by joint-links of connecting-rod *e e*, with a vertical slide, *f*, working in suitable ways, and provided at the lower end with a wrist-pin, *g*, fitted to an eccentric groove, *h*, in a wheel, *i*, on a horizontal shaft, *j*, receiving motion from a driving-shaft, *k*. By this or other equivalent means a vibrating or rotary reciprocating motion is imparted to the two plates. From the point 1 (the lower edge) to the point 2 (the upper edge) the surface of each plate is the segment of a circle struck from the axis of vibration. At the point 2 the surface of each is recessed to form a square or rather nearly square edge.

In Fig. 3 the plates are represented as thrown back and ready to begin their action on the pods of cotton, and in Fig. 4 they are represented as at the end of their action. In Fig. 3 the lower edges are carried up so far as to be sufficiently separated to permit the pods lying on the top to descend between them, and as the plates begin their action the two lower edges approach sufficiently to grip the pods below the seeds, and then being each concentric with its axis of vibration, the two continue to roll on the pods, gradually forcing the seeds out until the upper edges come as near together as may be, and, as represented in Fig. 4, to finally liberate the pods from the seeds, which rest on these edges by reason of the recesses made in the surfaces at 2, the object being at the end of the operation to grip the pods as near to the seed as possible, which could not be done if the curved gripping-surface were extended beyond. The plates, having completed their gripping action on the pods, as represented in Fig. 4, then vibrate back to their original positions to liberate the pods separated from their seeds. As the plates are vibrated back, two parallel rollers, $l\ l$, are made to approach each other sufficiently near to catch the pods and draw them through. These rollers I prefer to cover with vulcanized india-rubber or other elastic substance to prevent injury to the fibers; or, instead of this, an endless belt or sheet of india-rubber, or equivalent substance, may pass around each roller and a corresponding roller below; but I have made the rollers of iron, covered with india-rubber, as represented in the drawings, and communicate to them a continuous rotary motion by bands $m\ m$ from two shafts, $k$ and $n$. These rollers are fitted to the under faces of the vibrating plates, and their journals mounted in suitable boxes in the ends of the plates, and the axes of the rollers are eccentric to the vibrating plates, so that as the plates make their back vibration to liberate the pods the rollers are carried toward each other to grip and carry them through, and as the plates begin their action on the pods the rollers are drawn apart so far as not to act on the pods, so that during the whole operation there is no tendency to pull the fibers or otherwise break or injure them.

In Fig. 1 a portion of the surface of the vibrating plates is represented without the recesses to form the upper edges of the gripping-surfaces, as my invention may be employed without the edges and answer a good but not so good a purpose as with them; and a portion of the working-surface, as at $o\ o$, is also represented as being fluted, as I have found that this can be done without injury to the fibers, as on the principle of my invention these surfaces merely roll on the pod of cotton and do not draw or pull the fibers from the seeds, as in the roller-gin, and therefore metal surfaces can be employed safely. The surfaces of the plates $b\ b$ above the upper edges are extended (as shown) to form a species of hopper to hold the seeds and pods during the action of the surfaces, and when thrown back form inclined planes for the discharge of the loose seed. From the construction of the vibrating plates giving them stiffness they can be made of considerable length without danger of flexure.

I have described and represented the mode of construction which has been tried with success; but I do not limit myself to it, as the construction may be greatly varied without materially changing the mode of operation.

What I claim as my invention, and desire to secure by Letters Patent, is—

1. The mode of operation of the vibrating curved surfaces, substantially as described, for the purpose of forcing seeds out of the pods of cotton, as set forth.

2. In combination, making the said vibrating curved surfaces with recesses to form what is herein termed the "upper gripping-edges" to act upon the pods near to the seeds toward the end of the operation.

3. In combination with the vibrating curved surfaces, the employment of rollers, or their equivalents, acting intermittently, substantially as described.

LEWIS S. CHICHESTER.

Witnesses:
  WM. H. BISHOP,
  CHAS. W. BAMBURGH.